(12) United States Patent
Griffis

(10) Patent No.: US 10,991,217 B2
(45) Date of Patent: Apr. 27, 2021

(54) SYSTEM AND METHODS FOR COMPUTERIZED SAFETY AND SECURITY

(71) Applicant: Delta Thermal, Inc., Tucson, AZ (US)

(72) Inventor: Andrew Griffis, Tucson, AZ (US)

(73) Assignee: Delta Thermal, Inc., Tucson, AZ (US)

( * ) Notice: Subject to any disclaimer, the term of this patent is extended or adjusted under 35 U.S.C. 154(b) by 0 days.

(21) Appl. No.: 16/779,622

(22) Filed: Feb. 2, 2020

(65) Prior Publication Data
US 2020/0250944 A1 Aug. 6, 2020

Related U.S. Application Data

(60) Provisional application No. 62/800,475, filed on Feb. 2, 2019.

(51) Int. Cl.
| | |
|---|---|
| *H04N 5/33* | (2006.01) |
| *G08B 13/19* | (2006.01) |
| *G08B 13/196* | (2006.01) |
| *G06K 9/32* | (2006.01) |
| *H04N 5/232* | (2006.01) |
| *G06K 9/20* | (2006.01) |

(52) U.S. Cl.
CPC ........... *G08B 13/19* (2013.01); *G06K 9/2018* (2013.01); *G06K 9/3241* (2013.01); *G08B 13/1963* (2013.01); *G08B 13/19636* (2013.01); *G08B 13/19656* (2013.01); *H04N 5/23238* (2013.01)

(58) Field of Classification Search
None
See application file for complete search history.

(56) References Cited

U.S. PATENT DOCUMENTS

| | | | | |
|---|---|---|---|---|
| 2016/0313442 | A1* | 10/2016 | Ho | A61B 5/0008 |
| 2017/0370775 | A1* | 12/2017 | Kusukame | G01J 5/0806 |
| 2018/0035084 | A1* | 2/2018 | Swiss | H04N 7/183 |
| 2018/0149949 | A1* | 5/2018 | Kim | F16M 13/022 |
| 2020/0224460 | A1* | 7/2020 | Miller | E05B 73/0047 |

* cited by examiner

*Primary Examiner* — Eileen M Adams
(74) *Attorney, Agent, or Firm* — Jennings Strouss & Salmon PLC; Daniel R. Pote

(57) ABSTRACT

Systems and methods are provided for measuring, assessing, predicting, improving and presenting the state of physical object temperatures using imaging devices, e.g., a thermal infrared camera, and/or intruders in a region of interest to an operator, such that little or no operator effort is required to install, use or receive reports from the system. The invention also includes, for example, means and methods for exploiting autonomous operation and configuration, placement at remote sites, enhancement of image resolution and estimation of range such that accuracy of results and autonomy of operation is enhanced.

14 Claims, 7 Drawing Sheets

SYSTEM AND METHODS FOR COMPUTERIZED SAFETY AND SECURITY

CROSS REFERENCE TO RELATED APPLICATIONS

This application claims priority to U.S. Provisional Patent Application No. 62/800,475, filed Feb. 2, 2019, the entire contents of which are hereby incorporated by reference.

TECHNICAL FIELD

The present invention generally relates to sensor data collection and processing for safety and security. More particularly, the present invention relates to thermal and color image sensor data collection and image processing for the purpose of industrial site security, e.g., perimeter security and safety, via thermographic measurement of industrial assets in space and time.

BACKGROUND

In the field of industrial thermography, the current standard practice is to use handheld devices to make image measurements and subsequently combine these with additional supporting physical measurements (e.g., atmospheric conditions for absorption). Sequences of manual operations are often combined with computer assisted operations to produce reports corresponding to the point in time at which the handheld measurements were made.

Thus, present day practices for the measurement of the physical temperature of industrial equipment often involve human measurement, e.g., with a handheld thermographic device, followed by manual measurements and assessments of contributing factors. Contributing factors may include, for example, equipment optical properties, environmental properties, and sources of thermal energy other than the equipment being assessed. Such additional assessments are made to increase the accuracy of the equipment temperature reported by the handheld thermographic device.

Such manual measurements can be valuable to the owners and operators of equipment, but often the equipment being assessed is in a dangerous area, e.g., high voltage electrical transformers, or in a dangerous state, e.g., on the verge of exploding due to transformer oil nearing its flash point. Further, since underlying thermal processes for the measured equipment typically vary on a scale of minutes or hours, making a single measurement on a yearly or even a monthly scale can lead to erroneous indicators of health and status.

At the same time, there is also a known risk of malevolent human intrusion at some equipment sites, either for the purposes of theft or sabotage, and these also endanger both industrial assets and the humans who visit them in order to assess physical temperature or make other assessments of physical condition that affect performance and utility of the equipment. Consequently, it is advantageous to use both security and thermography functions so as to minimize injury to equipment or humans who use or visit the equipment.

The present invention addresses these and other limitations of the prior art.

SUMMARY OF THE INVENTION

The following is a summary of the invention intended to provide a basic understanding of some aspects of the invention. This summary is not intended to identify key or critical elements of the invention or to delineate the scope of the invention. Its sole purpose is to present various concepts of the invention in a simplified form as a prelude to the more detailed description and the defining claims that are presented later.

The present invention relates to systems and methods for measuring, assessing, predicting, improving, and presenting the state of physical object temperatures using imaging devices, e.g., a thermal infrared camera, and/or intruders in a region of interest to an operator, such that little or no operator effort is required to install, use, or receive reports from the system.

These and other features and advantages of the invention will be apparent to those skilled in the art from the following detailed description of preferred embodiments, taken together with the accompanying drawings.

DETAILED DESCRIPTION OF PREFERRED EXEMPLARY EMBODIMENTS

Figure 1:
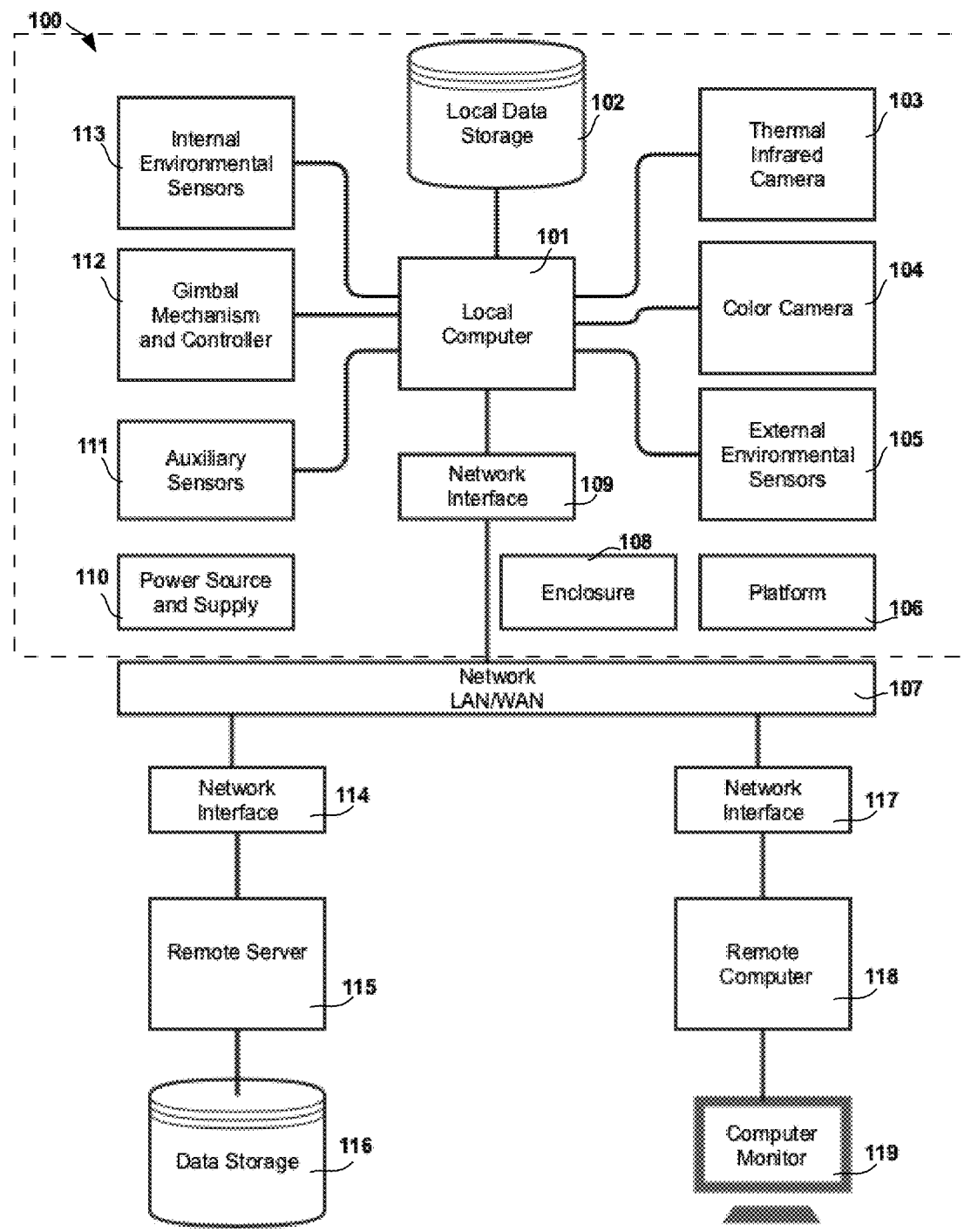
FIG. 1, is a block diagram of an embodiment of the invention.

In general, the present invention relates to the automation of industrial thermography. In that regard, the following detailed description is merely exemplary in nature and is not intended to limit the inventions or the application and uses of the inventions described herein. Furthermore, there is no intention to be bound by any theory presented in the preceding background or the following detailed description. In the interest of brevity, conventional techniques and components related to thermal imaging, image processing, computer processors, robotics, and calibration methods may not be described in detail herein as such topics are well known by those of ordinary skill in the art.

In accordance with one embodiment, in order to avoid unnecessary human risk resulting from measurement and/or unwanted intrusion or sabotage, the present invention enables the automation of thermographic measurement and intrusion detection such that a single system mitigates risk of harm to equipment and humans in an enterprise. Toward that end, embodiments of the present invention relate to an autonomous industrial security and safety system including one or more imaging devices with integral computing and data storage capacities configured in a network to which additional computers and storage devices may be connected, and to which a user may connect in order to access raw and processed data, and from which a user may receive automated communications concerning the current and likely future state of the physical assets being monitored. In accordance with one embodiment, the imaging device(s) comprise a multispectral imaging system having multiple axes of motion such that the fields of regard for the imaging devices can be changed through actuation, e.g., gimbal motion, in one or more axes, e.g., a pan-tilt gimbal, so as to produce a system field of view larger than that of a single image device. In this regard, the term "gimbal assembly" or the like is used herein without loss of generality. Any form of robotic system or multi-axis linkage system may be used to effect motion of the thermal infrared cameras.

In accordance with various embodiments, at least one non-visual (e.g., thermal infrared) image device is used for imaging objects in its system field of view, so that the thermal emission of imaged objects can be used to estimate object physical temperature from the measured thermal infrared radiance imaged by the thermal camera. Security function, e.g., perimeter security, is enabled by using thermal or other sensor or camera data to detect and report the presence of human, human-like, or human-related activity in areas for which such activity is of concern, e.g., prohibited to owners or operators of the industrial site. Computers that are integral to system imaging devices, e.g., onsite or embedded computers, may produce some or all of the data products required to achieve the security and safety functions.

Computing devices (e.g., desktop computers, laptop computers, tablet computers, smartphones, or the like) that are connected to system imaging devices by way of a network connection may also produce data products and will often be used for both the production of data products and associated reports, graphs, alerts and other results of interest to owners or operators of the industrial equipment being monitored. Security function extends to using cueing devices located remote from the invention that detect events and transmit signals received by the invention that it interprets and uses in a "slew-to-cue" fashion, using a gimbal to position the field of view, e.g., for the thermal infrared camera, in proximity to the device transmitting the signals.

The invention can be configured for equipment and intrusion monitoring manually by an operator, e.g., sitting near the invention or remotely at a desk over a network, or for automatic configuration. Automatic configuration of the system may involve, for example: using one or more computers to control the invention so as to survey its surroundings, detect and identify relevant objects or spaces, classify those objects and spaces, estimate their physical properties and the physical properties of their environment (e.g., such as would contribute to and affect an interpretation of temperature based on measurements, including but not limited to thermal radiance of nearby objects, atmospheric loss and scattering as a function of path length, optical path length, etc.), compute the movements needed to capture their data, schedule the data capture based on predetermined or statistically estimated risks and physical behavior (e.g., maximum rate of change) and initialize data collection databases in local storage and remote storage, e.g., "cloud" storage.

Automation enabled by embodiments of the invention also includes the use of gimbal and imaging devices to localize equipment or spaces, e.g., estimate distances from imaging devices to equipment or spaces in the measurement area, and combine it with GPS or other locationing techniques to determine its position on a map, and the production of enhanced resolution (or "super-resolution) using predetermined or measured properties of the imaging devices and related optics (e.g., point spread function). The invention also addresses the automation of the estimation of calibration parameters and equipment physical parameters, e.g., emissivity, using physical observables in the environment, e.g., atmosphere/sky, stellar objects, identifiable solids, and historical data on such objects and materials, such historical data providing time varying observables against which one may estimate, e.g., via regression or otherwise statistical methods, unknowns that then permit accurate assessment of observables. The present invention contemplates achieving such automation through the use of data alone or in combination with physical and mathematical models of underlying phenomena.

Autonomous Operation at Site

In accordance with one embodiment of the invention, a site may be rapidly and autonomously monitored for both thermography and security. With reference to the conceptual block diagram of FIG. 1 in conjunction with the flow chart of FIG. 5, an exemplary flow 500 of an embodiment of the invention will now be described. As shown, the method begins (at step 501) with the placing of a system (FIG. 1) at a known geographic location. In accordance with one embodiment, this placement is made straightforward by virtue of the use of a mobile platform 106 and enclosure 108 having autonomous means of supplying its power, e.g., solar or wind or equivalent autonomous (or self-contained) power source 110, so that placement constitutes an installation once a user enables power, e.g., with a power switch, for the system (step 502).

The system then finds a network (step 503), e.g., wireless LTE or WiFi mesh, or physically connected network should such be available at the site, and connects (via network interfaces 109, 114, and 117) (step 504) to a remote server 115 preconfigured for use with the system. Subsequently, the system will send GPS, e.g., from a GPS auxiliary sensor or from a GPS integrated into the LTE radio etc., and a unique system identifier (step 505) preconfigured at the time of system manufacture to the remote server 115. The system then is able to receive its initial tour and security settings (step 506). The "tour" describes a sequence of locations at which the system collects data and transmits the data to the remote server 115 such that thermographic data can be collected for objects imaged at each location. The "security settings" describe the spaces for which thermal and/or color video are streamed to the local computer 101 and also the remote server 115 such and data storage 116 hat a user might review prior video data or view live video data on a remote computer 118 on its computer monitor 119 or equivalent display device. Data may also be stored on local data storage 102.

Given an attitude, heading and reference system (AHRS) device connected to an auxiliary sensor input 111 the AHRS can be used to orient the gimbal 112 (step 507) such that the initial tour and security settings have relevance to a site, such relevance having been established by a precomputed site assessment based on aerial or satellite data, e.g., such as one commonly finds on internet mapping services. Alternatively, the relevance has been provided by end user input when the system was purchased or otherwise secured for service at the site. The flow of FIG. 2 can then be used to generate an object catalog 211 for each camera to be used at the site (step 508), the color camera being the default and typically the most useful (a thermal camera can be used, but it may have a smaller set of object features with which to estimate object types and characteristics); this motivates the aforementioned a priori tour and security settings, as, for example, a late-in-the-day installation of the system may not allow adequate sunlight for capturing a color camera panorama and a thermal panorama is not wanted. Given an object catalog for the site, the objects can be selected and prioritized for thermography (step 509); spaces are also then selected and prioritized for security 510. These priority settings are either provided through dialogue with end users, e.g., a customer service phone call prior to installation after which time a customer service agent enters the data into the user's profile for the site etc., or the priority settings are computed based on statistically derived risk factors that draw from historical data from other users or other a priori data that can be used in a decision tree or equivalent probabilistic framework.

The method proceeds by posting object catalog and priority lists to the remote server (step 511), which makes it possible to review data for the user by a remotely located expert, e.g., at a remote computer 118, any corrections for which could be approved and entered, after which time they can be used to update the system automatically or manually. The system then connects image streams to local and remote VMS (video management system) resources (step 512). The local VMS analyzes and stores all relevant video data locally and transmits a subset of the data to the remote VMS running on the remove server 115 such that bandwidth is minimized on the network connection, e.g., LTE wireless in which case data is relatively expensive for users. The remote VMS enables a user to review historical/archival events and video segments while also, as needed, viewing live video from a site, e.g., in the event there is a security incident that requires observation. The local VMS is configured for recording and storing locally on a continuous basis, up to some desired interval, e.g., 3 days, 1 week, 1 month, etc.

The system is now able to begin its duties (the sequence thus far having taken place in a matter of minutes, typically), beginning with executing a tour per its schedule while also enabling the use of calibrated data (step 513). This means that, in one embodiment, the gimbal will visit each object cataloged in priority order and/or timing and collect data. Since the data collected is now thermographic, it must be calibrated in order to be maximally useful. Thus the image streams are extended to or switched to calibrated image streams. For each tour event sequence, the system will post thermography data to a remote server 115 (step 514) and then post any auxiliary, internal, or external sensor data (from sensors 105 and/or 113) (step 515) to the same server. The remote server 115 is then able to update corresponding analysis and graphing features that users might access by way of a network connection and a user interface, e.g., browser display (step 516).

Figure 7:
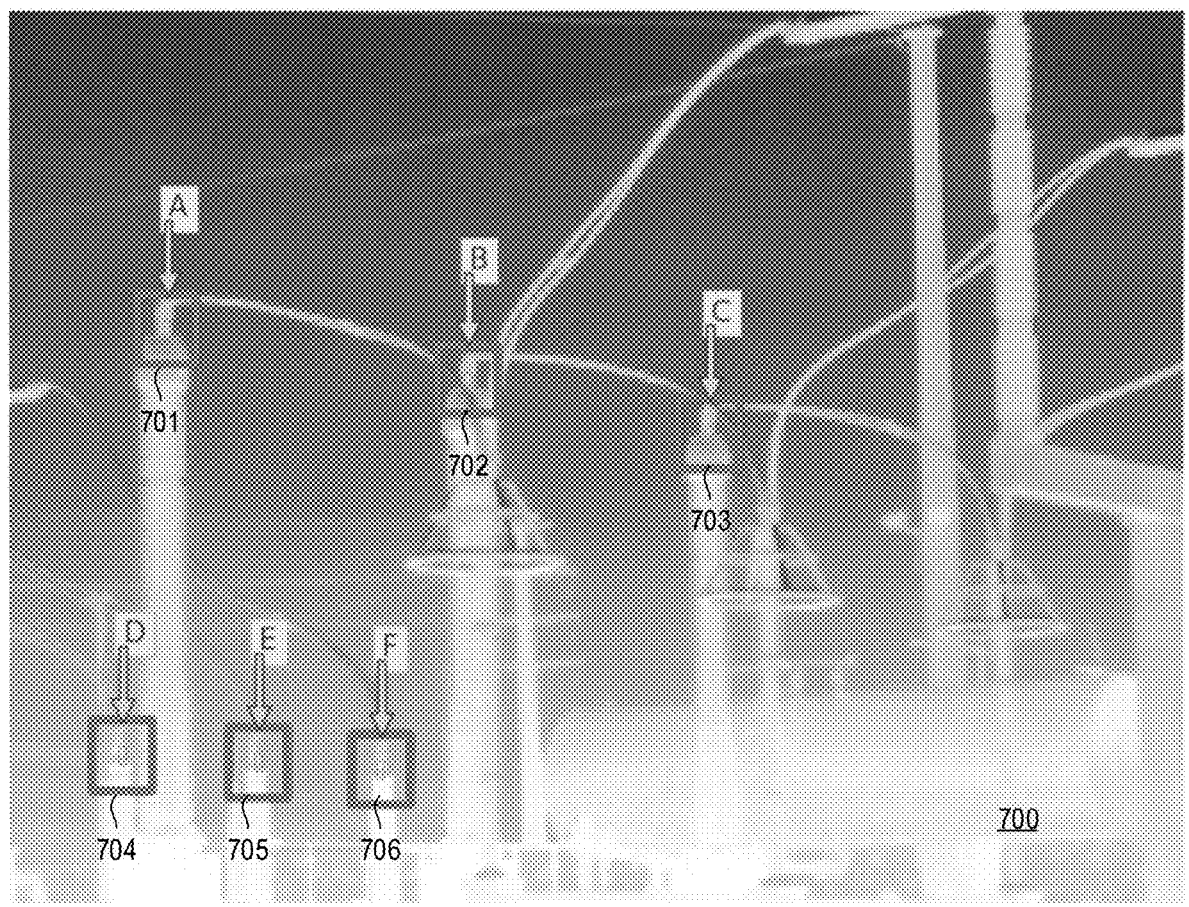
FIG. 7 is an exemplary thermal image useful in describing various aspects of the present invention.
Figure 8:
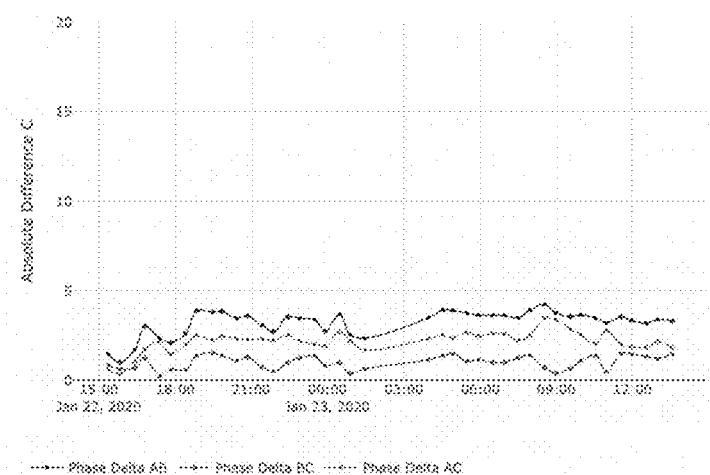
FIG. 8 is a graph of absolute temperature difference associated with a portion of the objects illustrated in FIG. 7.

As one non-limiting example, FIG. 7 illustrates a thermal image of an environment associated with a site 700 corresponding to a public utility in the U.S. during the day, and FIG. 8 is a plot of absolute temperature difference (° C.) for three phases of a portion of the objects previously identified in the image. In particular, FIG. 7 illustrates six objects (bushings, in this case) labeled A-F, which correspond to bounding rectangles 701-706, respectively. The objects being assessed in FIG. 8 ('A', 'B', 'C') are bushings for a primary operating at 345 KV, while objects 'D', 'E', and 'F' are the secondary phases. FIG. 8 then visualizes the temperature trends for the three phases (AB, BC, and AC) associated with the objects.

Referring again to FIGS. 1 and 5, as time progresses, the remote server 115 makes assessments based on the new data sets and will send messages, alerts or alarms to users using a Network 107, e.g., local area network (LAN) or wide area network (WAN) such as the internet (step 517).

Figure 5:
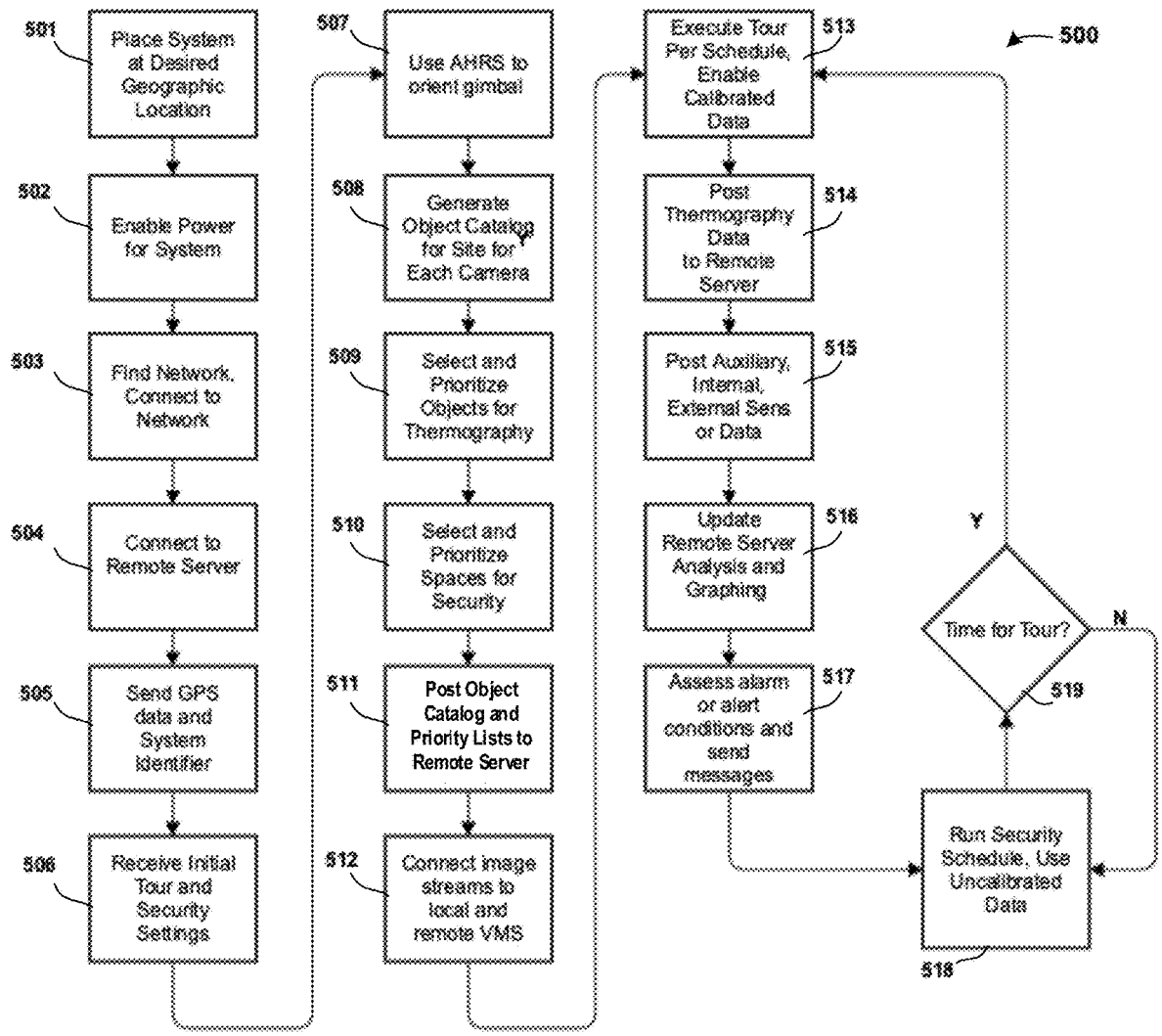
FIG. 5 is a block diagram illustrating an embodiment of using the invention for automated thermography and security.

Upon completion of a thermography tour, the security function begins or continues, in which the system runs a security schedule and uses uncalibrated data (step 518) for its VMS related functions and services. Periodically, following the predetermined interval selected for the thermographic tour frequency, a tour will begin (step 519) and repeat the steps of 507 to 512. In this way, the system produces autonomous thermographic and security services using a system embodiment such as is shown in FIG. 1 and using a flow such as is illustrated in FIG. 5.

Platform Supporting Autonomous Operation

Figure 6:
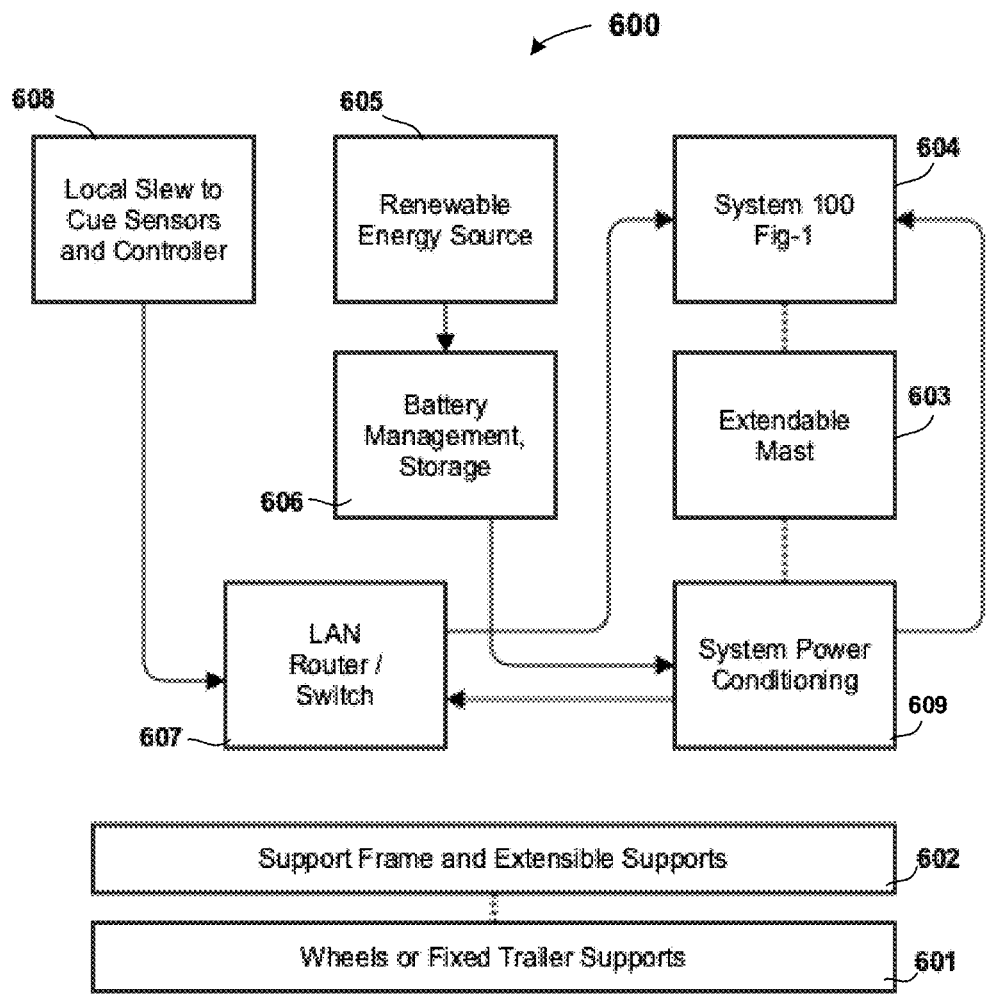
FIG. 6 is a block diagram of an embodiment of the platform used in remote installations of the invention.

In accordance with various embodiments, the autonomy of the system, especially for remote sites, is greatly assisted by the Platform 106 features of the system, which are illustrated in the exemplary embodiment illustrated in FIG. 6. Providing a wheeled platform that is readily transported enables it to be used at multiple sites for relatively short amount of times; this is helpful when short term surveys are required to assess a site for marginal equipment or site behavior prior to a permanent installation, or if sites are somewhat transitory, e.g., in the case of mobile electrical substations. Likewise, the use of an extendable or telescoping mast or support for the embedded system 100 enables greater ease of transport. Further, using renewable energy sources, e.g., wind or solar or equivalent, prevents the need for an electrical connection to a site, which in the case of remote electrical substations, saves cost and time and regulatory burden. Additionally, using wireless networks having wide area coverage, such as is available through satellite or commercial telecommunications services e.g., LTE, enables use of the system without the need for a site network connection and therefore removes the need for site network equipment.

With reference to the conceptual block diagram of FIG. 6, a platform that supports autonomous operation 600 generally includes a support frame with extensible supports 602 that together are used as a foundation and enable leveling and stabilization of equipment mounted on the platform. This frame 602 is further supported by wheels or fixed trailer supports 601 that enable either towing the platform or hauling it atop another trailer, whichever arrangement is desired by the users. The equipment integrated onto the support frame 602 includes an extendable mast 603 that supports the system 100 shown in FIG. 1, e.g., the gimbal and cameras and electronics/optics they house or carry. The system 100 is powered by way of a system power conditioning 609 unit that obtains its power, in turn from a battery management, storage assembly 606 which maintains optimum battery voltages and manages the renewable energy source 605 generally. The renewable source is typically solar or wind, and can be replaced by a wired connection to traditional, e.g., 120-240V AC power source, or other, e.g., DC power source, in either case representing an on-site source of power the precludes the need for a renewable source. Since the platform and supported equipment illustrated in FIG. 6 are often located at a remote geography away from traffic or physical security, it is helpful to have a local intrusion detection system that continually monitors the platform (i.e., looking down from a mast mounted location or looking out from the base of the platform, or instantiated as one or more unattended nearby ground sensors that are in communication with the system) for activity. This local slew to cue sensor(s) and controller 608 uses the LAN Router/Switch 607 connection to command the cameras that are part of the system 100 to break away from their tour or security duties and collect, process and send imagery of the platform (step 604) to a remote server and, if remote or local computers 115, 118 produce an intrusion assessment, send messages to users that are responsible for site security. This slew to cue capability, being a built-in function for the system 100 also enables site perimeter based cueing devices to be used to cue the system over the system LAN or by way of an independent wireless connection, e.g., LTE or equivalent.

Automatic Configuration of a Site

In accordance with the invention, the site where the system is installed and used for safety and security monitoring can be mapped and assessed so that objects, e.g., equipment, and spaces within view of the system are located and labeled, after which time they can be observed over time for thermographic behavior and occupancy by humans or other moving objects or organisms. The system is configured for the site in which it is located using capabilities illustrated in the embedded system 100 of FIG. 1 and the sequence of operations illustrated in the flow chart of FIG. 2.

Figure 2:
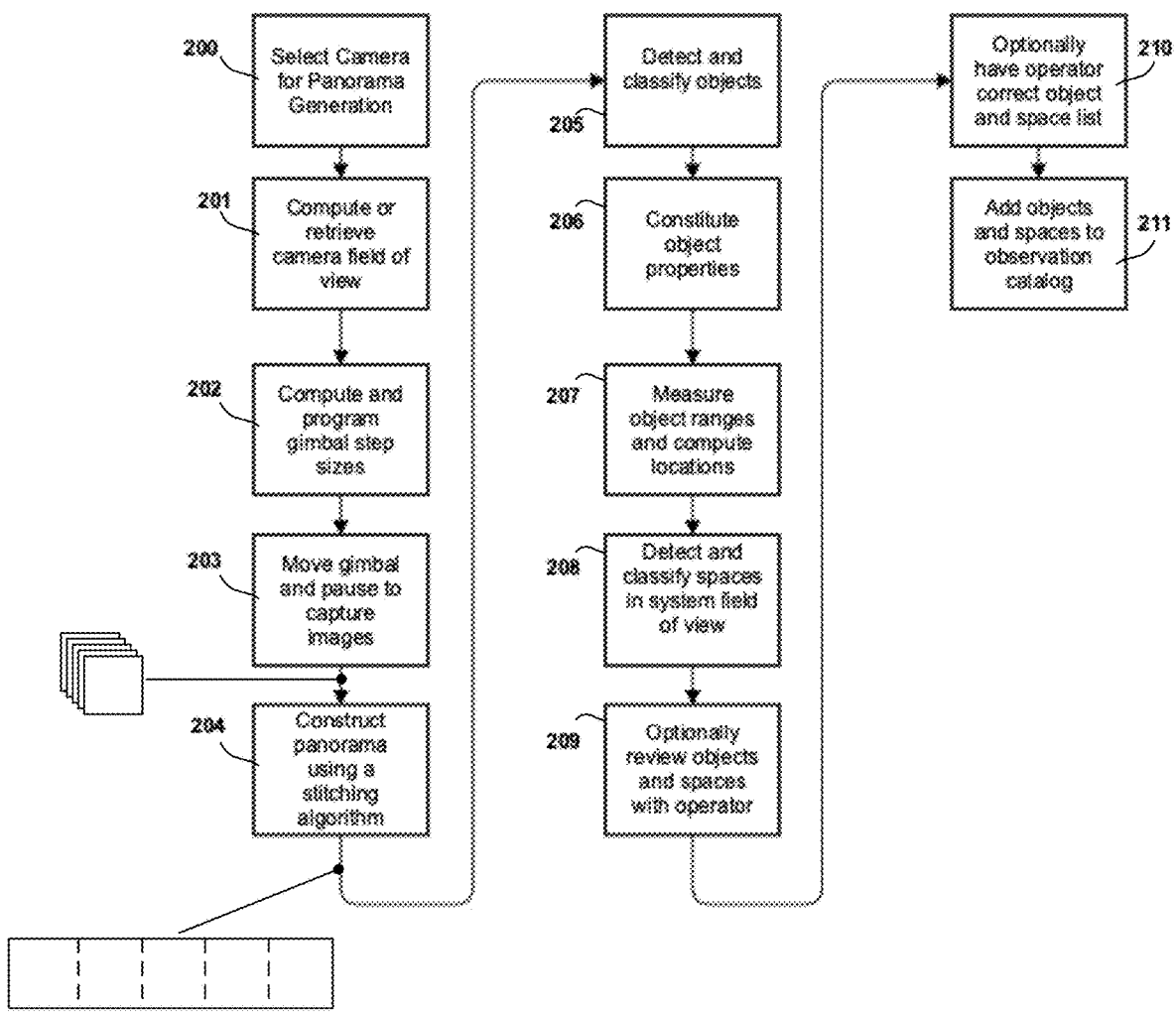
FIG. 2, is a block diagram illustrating an embodiment of automatically producing an object catalogue for a site.

With reference to FIG. 1 and FIG. 2, an embedded system 100 is used to assess the site of the system installation and produce a catalog of objects and spaces at the site to be monitored. The method of FIG. 2 begins with the selection of a camera to use in panorama generation (step 200), e.g., a Thermal Infrared Camera 103 or a Color Camera 104 or an Auxiliary Sensor 111. The method continues by computing the camera field of view (step 201), e.g., from known parameters such as focal length, pixel size, and number of pixels, or by retrieving it from a manufacturer database or other reference for the camera. This field of view is then used to compute a gimbal step size (step 202), allowing for some overlap between adjacent images, e.g., 10 percent of each of width and height is often acceptable, so that subsequent image stitching is more easily performed and to avoid losing data at image edges due to gimbal mechanical tolerances. The entire volume of space can be surveyed this way, e.g., typically a hemisphere, such that any objects viewable can be catalogued and used for subsequent measurements and observation. The gimbal is then moved in accordance with the computed step sizes (step 203) and images collected at each step while the gimbal is paused. The images gathered in this gimbal step sequence are then used to construct a panorama (step 204) using, for example, a stitching algorithm., e.g., by matching features in images and registering one image with respect to another this way, that merges image data from two fields of view into a single field of view. This stitched panorama image can then be used to detect and classify objects (step 205) that are found in the panorama using one of the many techniques available for object detection, e.g., neural networks or model-based methods or combinations of the two, for instance. This results in a list of objects, for which it is then possible to constitute object properties (step 206), e.g., object make or model, color, emissivity, etc. The object-system distances are then measured (step 207), using a ranging device or the system of FIG. 1 and the method of FIG. 3, so that each object in the site can be located accurately in three-dimensional space. The spaces, e.g., entries, exits, interiors, exteriors, ground, sky, etc., are then detected and classified (step 208). As it is sometimes advantageous to have a human review the work of a computer, the objects and spaces can then be reviewed with an operator (step 209) and subsequently corrected (step 210) before adding the objects and spaces thus classified and localized to an observation catalog (step 211). In so doing, various embodiments of the invention enable a site to be automatically configured for monitoring with the system of FIG. 1.

In accordance with various embodiments of the present invention, computing system 101 (as well as any other functional modules described herein) may implement one or more machine learning models that undergo supervised, unsupervised, semi-supervised, or reinforcement learning and perform classification (e.g., binary or multiclass classification), regression, clustering, dimensionality reduction, and/or such tasks based on the acquired images.

Examples of models that may be implemented by system 100 include, without limitation, artificial neural networks (ANN) (such as a recurrent neural networks (RNN) and convolutional neural network (CNN)), decision tree models (such as classification and regression trees (CART)), ensemble learning models (such as boosting, bootstrapped aggregation, gradient boosting machines, and random forests), Bayesian network models (e.g., naive Bayes), principal component analysis (PCA), support vector machines (SVM), clustering models (such as K-nearest-neighbor, K-means, expectation maximization, hierarchical clustering, etc.), linear discriminant analysis models.

Thermographic Measurements

In accordance with various embodiments of the invention, an intention for its uses is to produce estimates of physical temperature of catalogued objects, or parts thereof; this is the practice of thermography. Thermography requires, at minimum, an assessment of temperature over time. In keeping with the system of FIG. 1, thermography is practiced using a Thermal Infrared Camera 103. Such a camera produces images having pixel values that are proportional to the radiance of the objects in the field of view that correspond to the pixel values; imaged object radiance, for a thermal camera, e.g., one operating at wavelengths proximate to 10 microns, is proportional to imaged object physical temperature. Radiance is not identically equal to physical temperature, however, as radiance captured with a thermal camera is always only the apparent radiance, a physical observable that has object physical temperature as one of several contributing factors. Other contributing factors include, for example, object thermal emissivity, atmospheric radiance, radiance of the imaging apparatus (i.e., lens, window, iris or stop, etc.), radiance of nearby or geometrically related objects, wind speed, solar radiance and angle of incidence (i.e., as implied by time of day and geographic location). Thus, in order to accurately estimate object physical temperatures (an objective of the invention), it is necessary to remove from the thermal camera image data the effects of contributing factors, which by definition do not correspond to object physical temperature. Traditionally, the practice of thermography with human operators comprises human measurement of thermal images and estimation, sometimes supported with separate measurements, of contributing factors, along with subsequent correction of thermal image data which yields an estimate of object physical temperature that has a known, or at least intended, accuracy.

One goal of various embodiments of the invention is to automate the practice of thermography. Consequently, the apparatus of FIG. 1 serves as a proxy for a human operator who is equipped with thermal imaging apparatus and an ensemble of other measurement devices, all of which are deployed by the human operator to effect an accurate assessment of physical temperature and subsequent communication of the assessment to interested parties for objects of interest (in this case, catalogued objects). The practice of thermography when well performed by a human is repetitious, complicated, and requires significant physical, mathematical, and analytical skill and care (when poorly performed the practice is sometimes referred to as "pencil whipping"). An advantage of the present invention, as a means and method of thermography automation, is that electro-mechanical systems under computer control are well suited to tasks that are repetitious and complicated.

Having thus described a system for acquiring measurements, an exemplary method for doing so will now be described. Generally speaking, given a means of measuring apparent radiance of an object, $R_a$, and given a known relationship between physical temperature and radiance, e.g., such a relationship being typically provided by a thermal camera manufacturer (those with greater accuracy usually referred to as "radiometric thermal cameras"), the digital image data produced by a thermal camera can be described. For the sake of this discussion, it is assumed that the thermal camera comprises an assembly of digitizer, image sensor (e.g., a focal plane array), thermal lens, thermal window, in that order from thermal camera focal plane toward the object. With that in mind an equation for the digital image data produced can be written as

$$R_a = \tau_{win}(\tau_{atm}[\epsilon R_p + (1-\epsilon)R_r] + (1-\tau_{atm})R_{atm}) + r_{win}R_{rW} + (1-\tau_{win}-r_{win})R_W \quad \text{Equation 1}$$

Where the left-hand side of the equation is an object, apparent radiance, $R_a$ (embodied as a digital image data comprising an ensemble of image pixels that correspond to objects in the field of view of the thermal camera), $\tau_{win}$ is the transmissivity of the thermal window, $\tau_{atm}$ is the transmissivity of the atmosphere between the object and the thermal camera apparatus, $\epsilon$ is the object thermal emissivity, $R_p$ is the physical or self-radiance of the object, $R_r$ is the radiance of the object due to reflected energy, $R_{atm}$ is the radiance of the atmosphere between the object and the thermal camera, $\tau_{win}$ is the reflectivity of the thermal window, if present, $R_{rW}$ is the radiance incident on the thermal window that can be reflected, and $R_W$ is the radiance of the thermal window itself (by virtue of its nonzero absorption and thickness). In practice, the quantities $\tau_{win}$, $\tau_{win}$ can be measured in the laboratory and used thereafter. The remaining variables in the above equation for $R_a$ are assessed using standard models (e.g., MODTRAN for the atmospheric contribution), assumptions, or using instruments, e.g., a pressure/temperature/humidity sensor assembly to make an assessment of atmospheric loss using an a priori formulation. With this in mind, an exemplary method can be delineated for calculating object physical temperature, e.g., enabled by posting thermography data (514 in FIG. 5), where the posted data comprise one or more image data sets and have pixel values D that have a known relationship to the apparent object radiance $R_a$, e.g., given by $$D = \frac{A}{e^{B/R_a} - C} + E \quad \text{Equation 2}$$

Where A, C, E are constants determined in laboratory conditions (often by the thermal camera manufacturer); this is an instantiation of the so-called Planck equation for radiometry used to relate radiometric quantities to physical temperatures. Using Equation 2, it is then possible to measure D, use Equation 1, solve for and calculate $R_a$ in terms of D then proceed to use solve for and calculate $R_p$ in terms of $R_a$, which is related to the physical temperature, e.g., in degrees Celsius or in Kelvin, by a proportionality constant provided by the camera manufacturer (or obtained in a laboratory of one's own). To proceed toward an algorithm for automated solutions, we simplify Equation 1 by replacing known or static variables and variables for which we can insert an available physical observable, e.g., measured and modeled atmosphere, window temperature, etc., we obtain $$R_a = k_1[\epsilon R_p + (1-\epsilon)R_r] + k_2 \quad \text{Equation 3}$$

The relation expressed by Equation 3 will serve to delineate an exemplary sequence of steps for automating the estimation of physical object temperature, as follows:

1. Capture thermal image data containing pixels corresponding to the object of interest.
2. Register the image data to a predetermined reference image for which object pixel locations are known.
3. Obtain measurement and model data needed to compute $k_1$ and $k_2$.
4. Use predetermined object orientation data, e.g., from 3D measurement data obtained in accordance with FIG. 3, prior 3D mapping data, or surface orientation deduced from object recognition and stored in the object catalogue with other object identification data, etc., to establish surface orientation (angle of orientation with respect to gravitational vertical and horizontal) for the object pixels of interest
5. Use object orientation data to estimate angular dependencies of emissivity, solar and background contributors, e.g., object emissivity, solar radiance, periphery radiance, respectively, using geometrical relationships well established and known by those skilled in the art.
6. Obtain thermal image data for the hemisphere of measurement, defined here as the thermal-camera-viewable region (that which can be imaged with the field of view of the thermal camera and the gimbal it is attached to, if present) extending from the ground, e.g., beneath a thermal camera, to the sky overhead, such that the radiance contributed by any point in in the hemisphere within the viewable region can be estimated.
7. Alternately, obtain thermal image data for the hemisphere of measurement at such points as can contribute, geometrically (i.e., as implied by optical ray tracing of object pixels of interest) to the object radiance.
8. Use hemisphere of measurement data, solar illumination data, and other contributors to estimate $R_r$, e.g., by regression or other methods known to those skilled in the art.
9. Use known properties of the object surface, orientation (with respect to the thermal camera) to estimate object emissivity, $\epsilon$.
10. Use Equation 3 to calculate object radiance, $R_a$.
11. Use object radiance to calculate the object temperature using predetermined proportionality constants.
12. In this way the object radiance can be estimated to a first order, and this approach can be used to produce automated object temperature outputs, e.g., using a computer.

The above sequence of operations, or algorithm, can be extended further if all the objects observed in a physical setting are treated as a system of radiators that may contribute to the observed radiance for an object of interest. Given $R_{ir}$, $R_{ia}$, and $R_{ip}$ as the $i^{th}$ object reflected, apparent and physical radiance, and having measured $R_{ia}$ it is then possible to iterate for a solution producing approximate $R_{ir}$, $R_{ia}$, $R_{ip}$, where $R_{ir}$ is the radiance of the object of interest due to reflected energy, $R_{ia}$ is the radiance observable for the object—its apparent radiance, and $R_{ip}$, is the object internal or self-radiance—its own physical radiance. If $\in_i$ is the emissivity of the $i^{th}$ object, then the $i^{th}$ object will have apparent radiance $R_{ia}$ such that $$R_{ia} = \in_i R_{ip} + (1-\in_i) R_{ir} \qquad \text{Equation 4}$$

and since $R_{ir}$ is $$R_{ir} = \sum_{\substack{k=0 \\ k \neq i}}^{n} R_{ka} \qquad \text{Equation 5}$$

then $$R_{ia} = \epsilon_i R_{ip} + (1-\epsilon_i) \sum_{\substack{k=0 \\ k \neq i}}^{n} R_{ka} \qquad \text{Equation 6}$$

where $R_{ka}$ is the $k^{th}$ object radiance that can illuminate the $i^{th}$ object and reflect, producing a contribution to $R_{ia}$, the $i^{th}$ object apparent radiance. In these calculations, it is implicit that mathematical integration over solid angles occurs when necessary to produce irradiances from radiances, and that integration over physical areas is implied when producing power from irradiance. These integrals are not discussed explicitly here for the sake of simplicity. In all of these mathematical expressions, it is understood that the variables, e.g., $R_{ka}$, can be represented by scalar or vector quantities, including treating such radiances as point-wise time series, two dimensional arrays (images), or three dimensional collections of two dimensional images e.g., stacked temporally as a "Datacube". Further, given such a Datacube, time series of individual pixels (or groups of pixels, or both) can be extracted from it and used to estimate trends in the underlying physical temperature behaviors for the object implied by the chosen pixels. Thus, whether the radiance variables ae scalars, spatial vectors or time vectors, these equations can be used to construct iterators, regressions and systems of equations that support solutions for $R_{ip}$, using measurements that support $R_{ir}$ and $R_{ia}$. In such iterations or regressions, it is helpful to have multiple distinct data situations to provide insight and enable solutions for multiple variables. Some pairs of situations or variable situations contemplated by this invention are:

Day vs. night, Ambient hot vs cold, Energized vs. not energized, Wind vs. no wind, Background hot vs. cold, Shade vs. no shade, Vertical vs. horizontal emitter surface (or, simply not vertical), Load current high vs low, conductor thickness or conductivity, Multiple points at same surface (i.e., uniformity), Ground data, Sky data, Material class or type.

In all of the above, it is recognized that solving for $R_{ip}$ and/or $\in_i$ can be improved through the use of known/good physics, or physical models of underlying phenomena. In such cases, physical models are incorporated into the framework of Equation 1-6 and solutions, e.g., regression for coefficients or parameters, can be produced deterministically and/or stochastically as befits the particular solution scenario. It is also recognized that solution structures will sometimes benefit from neural networks including or modeled after systems of equations, e.g., Equation 4-6. The mapping of such equations to neural networks, e.g., those deterministic and/or stochastic in nature, and the methods of solution are well known to those skilled in the art.

Image Registration

In accordance with the invention, the objects at the site where the system is located will be imaged recurrently so as to assess their physical temperature over time. In order to assure consistency of measurement and given that the field of view of the camera(s) used may vary with time, e.g., owing to gimbal movement repeatability or due to motion of the support structure for the camera(s), the use of image registration, or pixel mapping, is contemplated with the invention. In the registering of images, a suitable reference image is selected for an interval of time, e.g., manually or using predetermined image characteristics to automatically select an image, and then all other images in that period of time are spatially adjusted so as to collocate objects by pixel location in space and time.

There are numerous methods for automatically registering images that are well known to those skilled in the art. In order to avoid the need for human intervention to produce registration results using such well known techniques, it is important to automatically identify image features, particularly locations where objects of interest are stationary and can reliably be used for registering temporally distinct images. A preferred embodiment for finding stationary objects uses a Datacube of thermal imagery, representing a time series of two-dimensional thermal images, as a means of identifying features to register, as follows:

1. Compute an edge representation of the data cube using spatial filtering of each 2D image contained in the Datacube, e.g., a Sobel or similar two-dimensional derivative based technique.
2. Binarize the edge representation of the Datacube.
3. Temporally integrate the Datacube for multiple temporal statistics, e.g., minimum, maximum, mean and variance, and use these to assess the spatio-temporal stability of edge features.
4. Identify edge features having low spatio-temporal variability and high levels of occurrence, such features representing the most probable stationary features.
5. Iterate through the edge features, selecting those with most favorable statistics first, masking these features from further consideration, and progressing to the next most favorable feature, etc., until the feature list is exhausted.

Having automatically produced a reliable set of image features, one of many image registration algorithms can be used to map edge features in a given image to corresponding image features in a reference image, the map thus produced permitting the calculation of corrections to apply to the given image to enforce spatial correspondence to the reference image.

While the preferred embodiment of feature selection makes use of edge features to identify features, it is here contemplated that other morphological features, e.g., corners, rectangles, circles, other non-geometric features having measurable statistics, can be used in a similar fashion to produce sets of features that can be used to compare pairs of images and spatially register one to another.

Further, given robust and accurate image registration techniques, it is contemplated that the invention will be used to locate objects with sub-pixel accuracy over time, which, in turn, enables the assessment of pixel-scale temperatures that would otherwise be impossible to observe reliably over time.

Corona Mapping

In accordance with one embodiment of the invention, object imagery is produced over a time period for diverse objects of interest, including electrically energized objects having electric field intensity sufficient to ionize air molecules (corona discharge) in proximity to the invention, e.g., in the air space near high voltage transformer conductors or bushings. This ionization is observable with the invention as collections of point sources that appear as a cloud-like structure in thermal imagery. The spatio-temporal behavior of the ionization is an indicator of state for the energized apparatus and can be used to make assessments of apparatus state that support predictive maintenance and failure onset. The invention thus contemplates the use of the spatio-temporal behavior of imagery of ionization events, e.g., performed using existing morphological detection and tracking algorithms known to those skilled in the arts of computer and machine vision, to assess the physical condition of proximate energized structures and devices.

Image Temporal Evolution

In accordance with various embodiments of the invention, object imagery is produced over a span of time such that temporal effects in 2D and 3D, e.g., when range data is integrated with thermographic data, can be observed. This corresponds approximately to the use of time lapse video, which when applied to thermographic data, can include analyzing time lapse video as a class of object detection and tracking, the object in this case being a region of temperature change, e.g., hot spot or cold spot, that can propagate in an electrical circuit and the structures associated with it. Treating three-dimensional heat propagation as a Thermal Object detection and tracking problem enables the re-application of many robust and mature algorithms in the domains of machine and computer vision. The invention contemplates the fact that different object classes, e.g., switches, fuses, arrestors, bushings, will have distinct shapes of heat propagation and that, as these shapes evolve over time, they will constitute different "motions" for the thermal energy that is propagating. As such, algorithms presently in use to track and interpret human behavior based on motion sequences can be applied to event detection in a thermographic setting. For instance, in the same way that patterns of human hand motion can be interpreted as various signals, e.g., sign language or commonly recognized gestures, patterns of heat propagation can be interpreted as various physical phenomena, e.g., loose connector, cracked bushing, motor bearing fatigue, etc.

Further, again viewing temporal sequences of thermal image data for a scene as a 3D Datacube, calculating a 2D image of pixel-wise temporal behaviors, e.g., mean, variance, intra-scene correlation, frequency domain filters, or other metrics derived from comparisons to physical models, allows identification of object features of interest in the spatial domain—temporal behavior can be detected using the spatial domain. Features of interest in this type of analysis include non-energized surfaces, surface emissivity and air convection surfaces. Such a view of data also permits quick analysis of trends between objects, such as the temperature differences between bushings for the three phases of a distribution transformer.

Deduction and Use of Site Schematic Data

In accordance with the invention, the objects at the site image data are gathered are often related to one another as elements of an electrical circuit. When this is the case, one can use the invention to capture 3D information about the viewable objects and support structures to construct a circuit diagram; alternately, a circuit diagram can be accessed from separate 3D observations or site design data. Given such a circuit diagram, the objects viewed and identified, e.g., manually or with computer vision techniques, at the site can be associated with circuit features. The thermal data subsequently gathered for objects can be used to interpret electrical loads using known physics, e.g., Ohm's Law, nodal analysis, and other analytical tools known to those skilled in the art of circuit behavioral analysis. Such treatment of the site data also enables the use of thermal data to support so-called "digital twin" strategies, wherein sensor data gathered for a designed system are used to update companion physical models of the system such that system state in the present and future can be estimated and exploited, e.g., for the assessments of state root causes or collateral effects.

Incorporation of Collaborative Sensors

In accordance with the invention, given connectivity permitted by a communications network or the signal connections of the computer processor that is integral to the invention, a multiplicity of sensors can be used to make assessments of site state as a function of time. For example, video security systems or unattended ground sensors (UGS) in proximity to the installed invention can be used to cue the invention for monitoring intrusions at the site. Alternately, UGS having calibrated thermal sensors, e.g., spot sensors, integrated into the structure that supports the invention or located independently and in proximity to the invention, can be used to either cue the invention to the presence of intrusion or thermal events or can be used for ground truth that supports algorithmic techniques for constraining solutions, e.g., for object physical temperature or emissivity. Further, as installation sites may often have other independent data collection systems the data from these may also be used by or with the invention to focus the observations on regions of heightened interest, e.g., hot spots or locations of probable anomalies.

Use of Reference Points as Constraints

In accordance with the invention the observed behavior of Thermal Objects, including with reference to independent measurements, e.g., spot measurements with hand instruments or additional devices integrated with the invention, e.g., UGS, will produce assessments of site regions for which there is elevated accuracy and reliability. By integrating independently collected comparison data for objects or deducing these from temporal behavior, e.g., permitted by Datacube analysis, it is contemplated that anchor points for constraining solutions for $R_{ip}$ and/or $\in_i$, for instance, can be automatically produced. Using such high confidence points enables more robust solutions by adding non-spurious information to the solution spaces. And in simple cases, it enables the automation of inter-object relative thermal trending.

Use of Scene Based Optical Characterization

In accordance with various embodiments of the invention, the objects that can be observed include, without limitation, the sun, moon, stars and other known point sources. In order to optimize the resolution of the system, it is contemplated that known point sources can be used to estimate the optical performance over time as concerns resolution, e.g., the point spread function (PSF) or equivalently the modulation transfer function (MTF). Knowing such behaviors permits improving the resolution and thereby the thermal accuracy of the system using techniques known to those skilled in the art, e.g., deconvolution or more sophisticated techniques such as the CLEAN algorithm, etc. Further, by observing the optical behavior over time, after accounting for known atmospheric variables, e.g., water vapor content, the invention can be used to deduce the optical effects of actual atmosphere conditions along the optical path, e.g., the blur induced by multiple scatter in the vertical atmosphere vs. the horizontal atmosphere. Finally, knowing optical parameters for the invention and its environment supports improved image optimization such as super-resolution.

Object Distance Measurements

In accordance with various embodiments of the invention, the objects at the site where the system is located may be assessed for their distance from the invention, such that objects can be accurately placed in three-dimensional space, e.g., global position data, in order to make further measurements of physical properties, sizes and relationships of objects by themselves and in relation to other objects.

Figure 3:
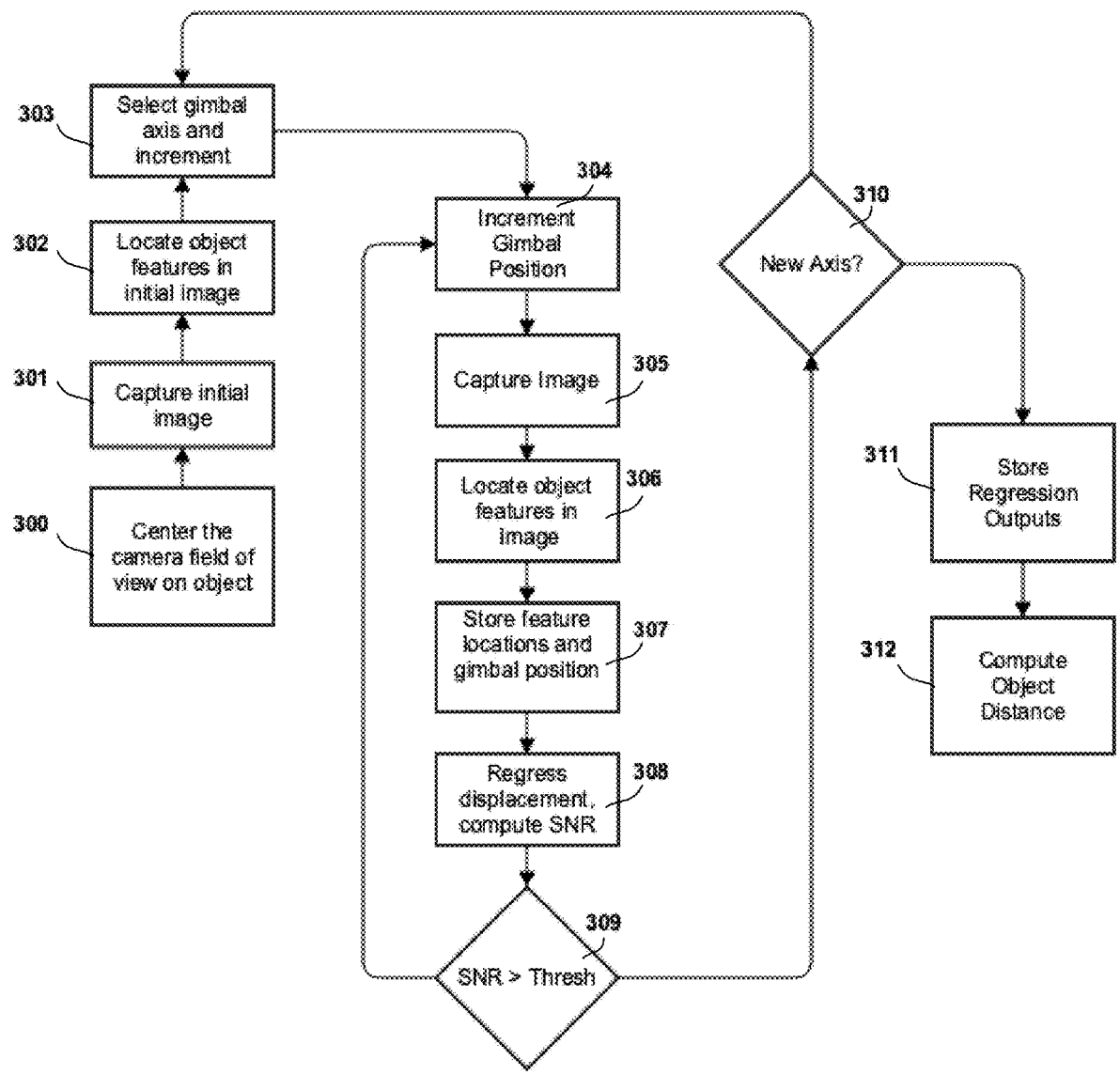
FIG. 3, is a block diagram illustrating an embodiment of estimating object range using the system of FIG. 1

The system is configured for the site in which it is located using capabilities illustrated in the embedded system 100 of FIG. 1 and the sequence of operations illustrated in the flow of FIG. 3 is used to compute object-system distances. This sequence is executed so as to generate a sequence of stereo-pair images, it being known in advance that stereo-pair imagery can be used to deduce distance relationships between an imaging apparatus and an object if the object coordinates (corresponding to physical distances in the focal plane of the camera being used) in the images and the physical image device focal plane separation are known. The relationship between these two distances is described as a disparity function and is well known by those skilled in the art. In the simplest case it is described by $z=f*b/d$, where z is the distance to the object, f is the focal length of the camera optics, b is the separation between images (focal planes) and d is the distance between objects in the stereo-pair images. In the present case, a single focal plane is placed at multiple physical separations by virtue of gimbal motion. This motion is usually rotary but is still effective since rotary motion produces translation in proportion to the radius of curvature of the arc of motion and the angular extent of the arc of motion. Because the motion is rotary however, the relationship $z=f*b/d$ is approximate and will have additional nonlinearities to address as a result of using rotation to produce displacement.

With reference to FIG. 1 and FIG. 3, an embedded system 100 is used to actuate (move) a gimbal in one or more axes of motion to discrete locations and capture one or more images at each position, such that a statistically significant variation in image feature locations (e.g., two dimensional pixel coordinates) is observed as a function of gimbal position (e.g., angular position of one or more axes) in order that a regression may be performed to deduce the relationship between feature location and gimbal position. This regression can be used with a disparity function to compute object range from the slope of the regression—the slope of the regression (which is b/d in the relationship $z=f*b/d$) being proportional to the object range.

The method illustrated in FIG. 3 proceeds by centering the camera field of view on the object for which distance is to be measured (step 300), capturing an initial image (step 301) and locating the object features 302 in that image. This first image will be a reference to which subsequent images will be compared, and differences computed, as the gimbal is moved away from its initial position. The flow proceeds by then selecting a gimbal axis of motion and related position increment (step 303) and executing a sequence repeatedly: capture image (step 305), locate object features in the image (step 306), store feature locations (pixel coordinates) and corresponding gimbal position (step 307) (gimbal angular coordinates), and then attempt a regression and a signal to noise ratio (SNR) (step 308), where SNR here is a statistic formed by the ratio of the major axis of the ellipse formed by the two-variable regression data scatter (as one encounters in a two-variable scatter plot) to the minor axis of the ellipse. In this case we are considering "signal" to be the object feature displacement and "noise" is the scatter of signal perpendicular to the regression line drawn through the plot of object feature displacement vs. gimbal displacement. This example is assuming a perfectly linear relationship for simplicity of discussion; it is contemplated that the relationship will be nonlinear. The steps 304 through 308 are then iterated until the SNR is larger than a predetermined threshold (step 309). If an additional axis of motion is to be used, this decision 310 can be executed and the sequence of 303 through 310 can be repeated until all axes of motion have been explored, including axes that are combinations of principal gimbal axes of motion. The flow is completed when gimbal axes have been exercised to produce displacement regressions for objects of interest, after which time the regression outputs are stored (step 311) and object distances are computed (step 312) from the relevant disparity function for the gimbal and camera.

There are many ways to improve the distance estimates. One that is contemplated for this system 100 including within the flow of FIG. 3, e.g., capture image (step 305), is the use of super-resolution techniques (e.g., using the flow of FIG. 4) to improve the resolution of the object displacement in image coordinates, the super-resolution being a means of computing new, smaller equivalent pixels in a focal plane using sub-pixel angular movements of the gimbal and, as needed, de-blurring of images based on known or measured optical properties of the camera lens (e.g., lens point spread function). In this way, the distance measurement may be improved.

Another way to improve distance estimates is through the use of image averaging, or stacking, as it is sometimes known, to increase the signal to noise ratio in an image by effectively increasing the integration time for each pixel in the image. As with the use of super-resolution, averaging finds use in the flow of FIG. 3 during capture image 305.

Image Super Resolution

In accordance with the invention, the objects and spaces observed with the invention, may be observed with greater fidelity, either for thermographic or intrusion purposes, with increased image resolution, e.g., more pixels per image or more pixels per degree of optical viewing angle. A known technique for achieving this purpose is super-resolution. Generally speaking, this technique involves combining multiple images of a scene, collected at different viewing angles, and subsequently combining these images so as to improve the resolution of the original image, effectively computing additional image pixels containing new information, that information being provided by other images.

Figure 4:
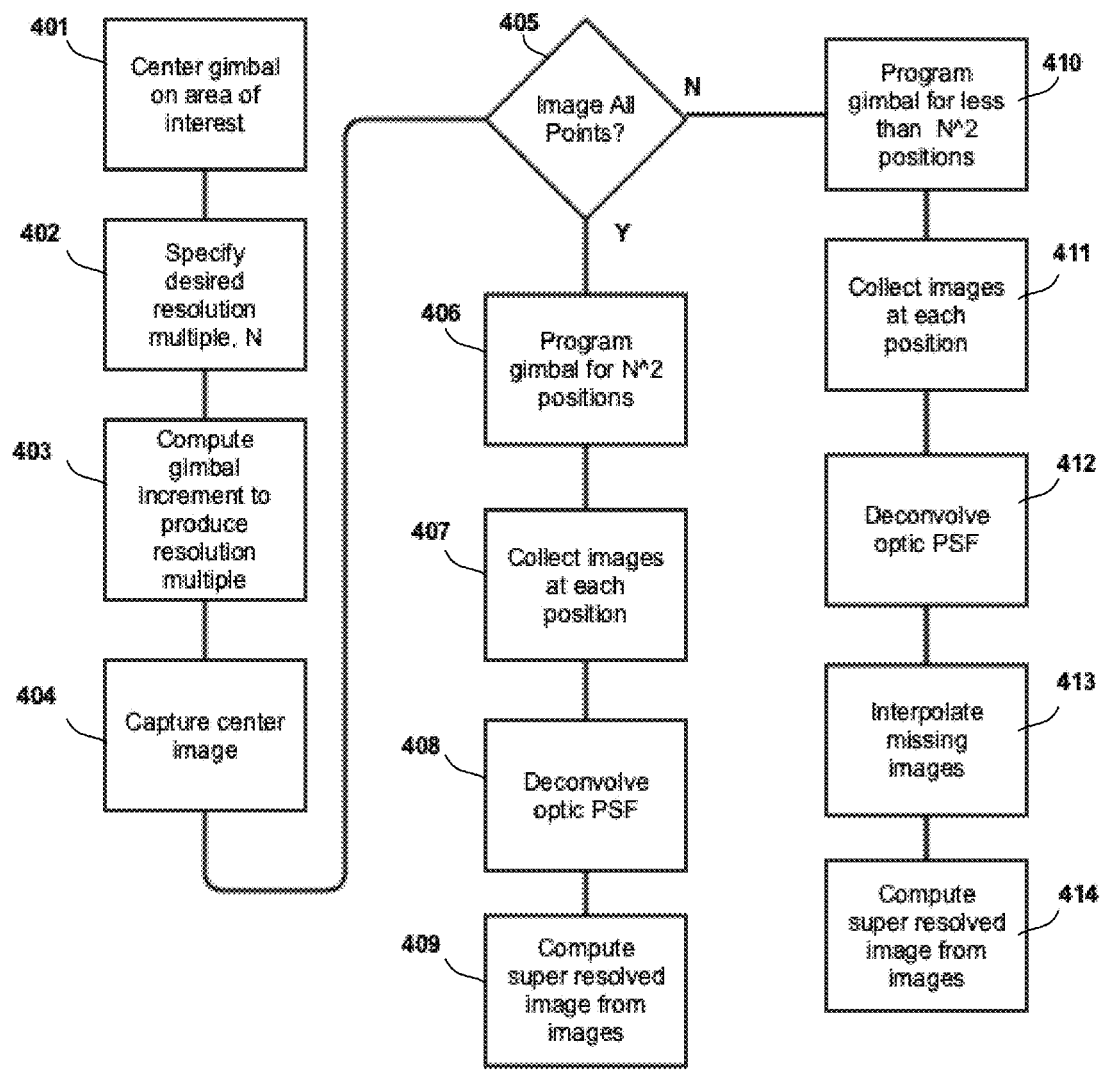
FIG. 4 is a block diagram illustrating an embodiment of super-resolving an image using a gimbal.

The system is configured for the site in which it is located using capabilities illustrated in the embedded system 100 of FIG. 1 and the sequence of operations illustrated in the flow of FIG. 4 is used to compute new pixels for an original image, such that a new super-resolution image is produced. The flow of FIG. 4 proceeds by first centering the gimbal on an area of interest (step 401), specifying the resolution desired as a multiple (N) of the unimproved resolution of the camera (step 402), and then computing a gimbal increment (in gimbal position coordinates) that will produce the desired resolution multiple (step 403) and finally capturing an image that is at the center (step 404) of the to-be-generated super-resolution image.

A decision can be made at this point in the flow as to whether to collect the maximum number of images required for super-resolution, or $N^2$ (=N×N) or whether a lesser number of images is to be used (step 405). The advantage to using fewer images is the speed and complexity of motions and subsequent super-resolution mathematics; the advantage to using all the images is that available super-resolution image data will be maximized. If $N^2$ images is selected, then the gimbal is programmed for all $N^2$ positions (step 406), images are collected at each position (step 407), effects of the known point spread function (PSF) of the camera are deconvolved (step 408) using one of many available techniques for PSF based image improvement, after which operation the flow computes the super resolved image from the image set (step 409) thus obtained. In a similar fashion, if all images are not to be used (step 405) then a movement pattern of less than $N^2$ is programmed into the gimbal (step 410), images are collected at each of these positions (step 411), the PSF is again deconvolved from the image data (step 412), images not collected are interpolated from the available images (step 413) and a super resolved image is computed (step 414) from the images collected and PSF-corrected.

In accordance with various embodiments, super-resolution such as the example flow of FIG. 4 can also be supported or replaced using additional cameras. For instance, images from a camera with one resolution and another camera with double the resolution but half the field of view could be combined into a single, higher resolution image of the same field of view as the lower resolution camera, such that the highest resolution occurs where the fields of view overlap, e.g., near the center of the image, the non-overlapping regions of the resultant image having its increased resolution derived from interpolating the original lower resolution image. In such instances, the camera PSF can be used to deconvolve imagery prior to combining images so as to maximize the insertion of new information into the resultant higher resolution image.

Additionally, if the camera with lower resolution and wider field of view is radiometrically calibrated, a higher resolution calibrated image may be computed by combining a relatively uncalibrated high-resolution image with the calibrated low resolution image, using the low resolution image as a "tie point" for the calibration of each pixel. In this way a costlier calibrated device may be used to produce enhanced imagery without the expense of a larger focal plane array.

Furthermore, if a panorama or wide area image is formed with a high resolution, narrow field of view sensor, e.g., one that may be low cost and relatively uncalibrated, this panorama may be used in combination with a lower resolution camera to produce higher resolution images at the time of subsequent measurements, by interpolating new, higher resolution pixels for combination with/into the lower resolution and, typically, calibrated image. This approach assumes a relatively static background condition for the panorama, e.g., a space or equipment assembly that does not move with time, so that the shape of the space represented in the panorama can be used to produce a similar shape in the otherwise unresolved pixels of a lower resolution image that occurs within the image extend of the high resolution panorama. This technique benefits from knowing the mapping of the instantaneous field of view for each pixel of each of the cameras (e.g., low resolution and high resolution) with respect to one another, and their PSF as a function of location in the focal plane array, such as can be obtained through a boresight alignment and optical characterization laboratory measurement.

In summary, an automated thermal imaging system in accordance with one embodiment includes: a thermal infrared camera configured to produce thermal images of objects at a site within its field of view; a gimbal assembly coupled to the thermal infrared camera, the gimbal assembly configured to move the thermal infrared camera to thereby adjust the field of view of the thermal infrared camera; a network interface; a power source; and a computer processor communicatively coupled to the thermal infrared camera, the gimbal assembly, the network interface, and the power source. The computer processor is configured to send position instructions to the gimbal assembly, capture a plurality of thermal images from the thermal infrared camera, produce a panorama image of the site based on the plurality of thermal images, detect and classify a set of objects of interest within the panorama image, produce state data characterizing the temperatures of the objects of interest, and transmit the state data to a remote server via the network interface.

In accordance with one embodiment, the system further includes a mobile platform configured to allow repositioning of the automated thermal imaging system to a selected site.

In accordance with one embodiment, the computer processor is configured to perform a self-configuration procedure based on objects detected and classified at the site during set-up, substantially without human intervention.

In accordance with one embodiment, the power source is a renewable autonomous power source drawn from the environment at the site.

In accordance with one embodiment, the computer processor is configured to perform the detection and classification of objects of interest using at least one machine learning model.

In accordance with one embodiment, the computer processor is further configured to perform intrusion detection based on the plurality of thermal images and send an alarm via the network interface when such an intrusion is detected.

In accordance with one embodiment, the system further includes at least one auxiliary GPS sensor configured to sense the location of the thermal imaging system and utilize that location data in producing the state data.

In accordance with one embodiment, the computer processor is further configured to use a Datacube time-series data structure for determining the state data.

In accordance with one embodiment, the computer processor is further configured to estimate corona effects for a high-voltage object of interest.

In accordance with one embodiment, the computer processor is further configured to perform a resolution enhancing process on the acquired thermal images.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices.

In addition, those skilled in the art will appreciate that embodiments of the present disclosure may be practiced in conjunction with any number of systems, and that the systems described herein are merely exemplary embodiments of the present disclosure. Further, the connecting lines shown in the various figures contained herein are intended to represent example functional relationships and/or physical couplings between the various elements. It should be noted that many alternative or additional functional relationships or physical connections may be present in an embodiment of the present disclosure.

As used herein, the terms "module" or "controller" refer to any hardware, software, firmware, electronic control component, processing logic, and/or processor device, individually or in any combination, including without limitation: application specific integrated circuits (ASICs), field-programmable gate-arrays (FPGAs), dedicated neural network devices (e.g., Google Tensor Processing Units), electronic circuits, processors (shared, dedicated, or group) configured to execute one or more software or firmware programs, a combinational logic circuit, and/or other suitable components that provide the described functionality.

As used herein, the word "exemplary" means "serving as an example, instance, or illustration." Any implementation described herein as "exemplary" is not necessarily to be construed as preferred or advantageous over other implementations, nor is it intended to be construed as a model that must be literally duplicated.

While several illustrative embodiments of the invention have been shown and described, numerous variations and alternate embodiments will occur to those skilled in the art. Such variations and alternate embodiments are contemplated and can be made without departing from the spirit and scope of the invention as defined in the appended claims.

The invention claimed is:

1. An automated thermal imaging system comprising:
a thermal infrared camera configured to produce thermal images of objects at a site within its field of view;
a gimbal assembly coupled to the thermal infrared camera, the gimbal assembly configured to move the thermal infrared camera to thereby adjust the field of view of the thermal infrared camera;
a network interface;
a power source; and
a computer processor communicatively coupled to the thermal infrared camera, the gimbal assembly, the network interface, and the power source;
wherein the computer processor is configured to send position instructions to the gimbal assembly, capture a plurality of thermal images from the thermal infrared camera, produce state data characterizing the temperatures of the objects of interest, and transmit the state data to a remote server via the network interface;
wherein the computer processor is further configured to produce a panorama image of the site based on the plurality of thermal images and detect and classify a set of objects of interest within the panorama image.

2. An automated thermal imaging system comprising:
a thermal infrared camera configured to produce thermal images of objects at a site within its field of view;
a gimbal assembly coupled to the thermal infrared camera, the gimbal assembly configured to move the thermal infrared camera to thereby adjust the field of view of the thermal infrared camera;
a network interface;
a power source; and
a computer processor communicatively coupled to the thermal infrared camera, the gimbal assembly, the network interface, and the power source;
wherein the computer processor is configured to send position instructions to the gimbal assembly, capture a plurality of thermal images from the thermal infrared camera, produce state data characterizing the temperatures of the objects of interest, and transmit the state data to a remote server via the network interface;
a mobile platform configured to allow repositioning of the automated thermal imaging system to a selected site.

3. An automated thermal imaging system comprising:
a thermal infrared camera configured to produce thermal images of objects at a site within its field of view;
a gimbal assembly coupled to the thermal infrared camera, the gimbal assembly configured to move the thermal infrared camera to thereby adjust the field of view of the thermal infrared camera;
a network interface;
a power source; and
a computer processor communicatively coupled to the thermal infrared camera, the gimbal assembly, the network interface, and the power source;
wherein the computer processor is configured to send position instructions to the gimbal assembly, capture a plurality of thermal images from the thermal infrared camera, produce state data characterizing the temperatures of the objects of interest, and transmit the state data to a remote server via the network interface;
at least one auxiliary GPS sensor configured to sense the location of the thermal imaging system and utilize that location data in producing the state data.

4. An automated thermal imaging system comprising:
a thermal infrared camera configured to produce thermal images of objects at a site within its field of view;
a gimbal assembly coupled to the thermal infrared camera, the gimbal assembly configured to move the thermal infrared camera to thereby adjust the field of view of the thermal infrared camera;
a network interface;
a power source; and
a computer processor communicatively coupled to the thermal infrared camera, the gimbal assembly, the network interface, and the power source;
wherein the computer processor is configured to send position instructions to the gimbal assembly, capture a plurality of thermal images from the thermal infrared camera, produce state data characterizing the temperatures of the objects of interest, and transmit the state data to a remote server via the network interface;
wherein the computer processor is further configured to use a Datacube time-series data structure for determining the state data.

5. An automated thermal imaging system comprising:
a thermal infrared camera configured to produce thermal images of objects at a site within its field of view;

a gimbal assembly coupled to the thermal infrared camera, the gimbal assembly configured to move the thermal infrared camera to thereby adjust the field of view of the thermal infrared camera;
a network interface;
a power source; and
a computer processor communicatively coupled to the thermal infrared camera, the gimbal assembly, the network interface, and the power source;
wherein the computer processor is configured to send position instructions to the gimbal assembly, capture a plurality of thermal images from the thermal infrared camera, produce state data characterizing the temperatures of the objects of interest, and transmit the state data to a remote server via the network interface;
wherein the computer processor is further configured to estimate corona effects for a high-voltage object of interest.

6. A method for automated thermal imaging, the method comprising:
providing a thermal infrared camera configured to produce thermal images of objects at a site within its field of view;
securing a gimbal assembly coupled to the thermal infrared camera, the gimbal assembly configured to move the thermal infrared camera to thereby adjust the field of view of the thermal infrared camera;
providing a network interface;
providing a power source; and
providing a computer processor communicatively coupled to the thermal infrared camera, the gimbal assembly, the network interface, and the power source;
sending position instructions from the computer processor to the gimbal assembly;
capturing a plurality of thermal images from the thermal infrared camera;
producing a panorama image of the site based on the plurality of thermal images;
detecting and classifying a set of objects of interest within the panorama image;
producing state data characterizing the temperatures of the objects of interest; and
transmitting the state data to a remote server via the network interface.

7. The method of claim 6, further including providing a mobile platform configured to allow repositioning of the automated thermal imaging system to a selected site.

8. The method of claim 6, further including performing a self-configuration procedure based on objects detected and classified at the site during set-up, substantially without human intervention.

9. The method of claim 6, wherein the power source is a renewable autonomous power source drawn from the environment at the site.

10. The method of claim 6, wherein the detection and classification of objects of interest is performed using at least one machine learning model.

11. The method of claim 6, further including performing intrusion detection based on the plurality of thermal images and sending an alarm via the network interface when such an intrusion is detected.

12. The method of claim 6, further including using an auxiliary GPS sensor to sense the location of the thermal imaging system and utilize that location data in producing the state data.

13. The method of claim 6, wherein the computer processor uses a datacube time-series data structure for determining the state data.

14. An automated thermal imaging system comprising:
a thermal infrared camera configured to produce thermal images of objects at a site within its field of view;
a gimbal assembly coupled to the thermal infrared camera, the gimbal assembly configured to move the thermal infrared camera to thereby adjust the field of view of the thermal infrared camera;
a network interface;
a power source;
a mobile platform configured to allow repositioning of the automated thermal imaging system to a selected site;
a computer processor communicatively coupled to the thermal infrared camera, the gimbal assembly, the network interface, and the power source;
wherein the computer processor is configured to:
send position instructions to the gimbal assembly;
capture a plurality of thermal images from the thermal infrared camera;
produce a panorama image of the site based on the plurality of thermal images;
perform a self-configuration procedure based on objects detected and classified at the site during set-up, substantially without human intervention;
detect and classify, using one or more machine learning algorithms trained during a set-up operation, a set of objects of interest within the panorama image;
produce state data characterizing the temperatures of the objects of interest; and
transmit the state data to a remote server via the network interface.

\* \* \* \* \*